(12) United States Patent
Singh et al.

(10) Patent No.: US 12,287,155 B2
(45) Date of Patent: Apr. 29, 2025

(54) METHOD FOR BUFFERING LATENT HEAT THERMAL ENERGY

(71) Applicant: UCHICAGO ARGONNE, LLC, Chicago, IL (US)

(72) Inventors: Dileep Singh, Naperville, IL (US); David M. France, Lombard, IL (US); Wenhua Yu, Darien, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 16/592,935

(22) Filed: Oct. 4, 2019

(65) Prior Publication Data

US 2020/0041216 A1 Feb. 6, 2020

Related U.S. Application Data

(62) Division of application No. 15/648,141, filed on Jul. 12, 2017, now abandoned.

(51) Int. Cl.
*F28D 20/02* (2006.01)
*F28D 7/16* (2006.01)
*F28D 15/00* (2006.01)
*F28D 21/00* (2006.01)

(52) U.S. Cl.
CPC ............ *F28D 20/023* (2013.01); *F28D 7/16* (2013.01); *F28D 15/00* (2013.01); *F28D 20/021* (2013.01); *F28D 21/0001* (2013.01); *F28D 21/0003* (2013.01)

(58) Field of Classification Search
CPC .......... F28D 20/023; F28D 7/16; F28D 15/00; F28D 20/021; F28D 21/0001; F28D 21/0003
See application file for complete search history.

(56) References Cited

U.S. PATENT DOCUMENTS

| | | | |
|---|---|---|---|
| 2,597,744 A | | 5/1952 | Morrison |
| 4,200,148 A | * | 4/1980 | Friefeld ............... F28D 20/021 60/659 |
| 4,250,866 A | * | 2/1981 | Telkes ................... F24H 3/025 126/110 A |

(Continued)

FOREIGN PATENT DOCUMENTS

| | | | | |
|---|---|---|---|---|
| DE | 102010004358 A1 | * | 6/2011 | ........... F28D 20/023 |
| DE | 102011052868 A1 | * | 2/2013 | ............. F28D 20/02 |

(Continued)

OTHER PUBLICATIONS

Mishra (Latent Heat Storage Through Phase Change Materials) (Year: 2015).*

(Continued)

*Primary Examiner* — Gordon A Jones
(74) *Attorney, Agent, or Firm* — MARSHALL, GERSTEIN & BORUN LLP

(57) ABSTRACT

The invention provides a method for reclaiming heat from a fluid, the method having the steps of contacting the fluid to a phase change material for a time sufficient to increase the temperature of the material and or liquefy some of it; and contacting the material to a second fluid for a time sufficient to increase the temperature of the second fluid and to decrease the temperature of the material or to solidify some of it.

22 Claims, 4 Drawing Sheets

(56) References Cited

U.S. PATENT DOCUMENTS

| | | | | |
|---|---|---|---|---|
| 4,250,958 | A * | 2/1981 | Wasserman | F28D 20/02 126/618 |
| 4,270,523 | A * | 6/1981 | van Heel | F28D 20/021 126/619 |
| 4,469,088 | A * | 9/1984 | Anzai | F24S 20/20 165/47 |
| 5,687,706 | A * | 11/1997 | Goswami | F24H 7/0433 126/263.01 |
| 6,000,438 | A * | 12/1999 | Ohrn | F16L 59/143 138/155 |
| 6,319,599 | B1 * | 11/2001 | Buckley | C09K 5/063 36/83 |
| 6,978,825 | B1 * | 12/2005 | Baylot | E21B 36/003 165/45 |
| 7,147,071 | B2 * | 12/2006 | Gering | B60L 58/27 237/12.3 B |
| 7,225,860 | B2 * | 6/2007 | Baginski | F28D 7/16 165/10 |
| 7,316,262 | B1 * | 1/2008 | Rini | F28D 20/023 165/10 |
| 8,201,615 | B2 | 1/2012 | Soukhojak | |
| 8,544,275 | B2 * | 10/2013 | Shinnar | F28D 17/005 60/659 |
| 9,765,251 | B2 * | 9/2017 | Dhau | F28D 20/023 |
| 2003/0015811 | A1 | 1/2003 | Klett et al. | |
| 2012/0048768 | A1 * | 3/2012 | Holloway | C09K 5/063 206/524.1 |
| 2012/0168111 | A1 | 7/2012 | Souhojak et al. | |
| 2014/0284020 | A1 * | 9/2014 | Amir | F28D 15/02 165/10 |
| 2015/0204612 | A1 | 7/2015 | Sun et al. | |
| 2015/0241137 | A1 * | 8/2015 | France | F28D 20/023 165/10 |
| 2017/0219293 | A1 * | 8/2017 | Kreuger | F24S 10/25 |

FOREIGN PATENT DOCUMENTS

| | | | | |
|---|---|---|---|---|
| EM | 84106653.3 | | 12/1984 | |
| EP | 1111118 | A2 * | 6/2001 | A47L 15/4291 |
| WO | WO-9402257 | A2 * | 2/1994 | A41D 31/065 |

OTHER PUBLICATIONS

R. Dyga a, S. Witczak; Investigation of effective thermal conductivity aluminum foams; Procedia Engineering 42 ( 2012 ) 1088-1099 ; Opole University of Techynology, Department of Process Engineering, Mikołajczyka 5, 45-271 Opole, Poland (Year: 2012).*

Donghui Zhang and Jun Wang; Thermal conductivity prediction of closed-cell aluminum alloy considering micropore effect; Advances in Mechanical Engineering 1-8 The Author(s) 2015 (Year: 2015).*

DE-102010004358-A1 mt (Year: 2011).*

Numerical investigation of PCM in vertical triplex tube thermal energy storage system for CSP applications; Cite as: AIP Conference Proceedings 1850, 080001 (2017); https://doi.org/10.1063/1.4984422; Saleh Almsater, Wasim Saman, Frank Bruno (Year: 2017).*

Studies on Paraffin-Graphite-Cu PCM Composites for Solar Thermal Storage Applications; Kavitha. K1, Arumugam. Solar Energy Division, Department of Physics, Gandhigram Rural Institute—Deemed University, Gandhigram. (Year: 2015).*

Charging-Discharging Characteristics of Macro Encapsulated Phase Change Materials in an Active Thermal Energy Storage System for a Solar Drying Kiln; Shailendra Kumar and V. S. Kishan Kumar (Year: 2017).*

DE102011052868A1 mt (Year: 2013).*

EP1111118A2 mt (Year: 2001).*

* cited by examiner

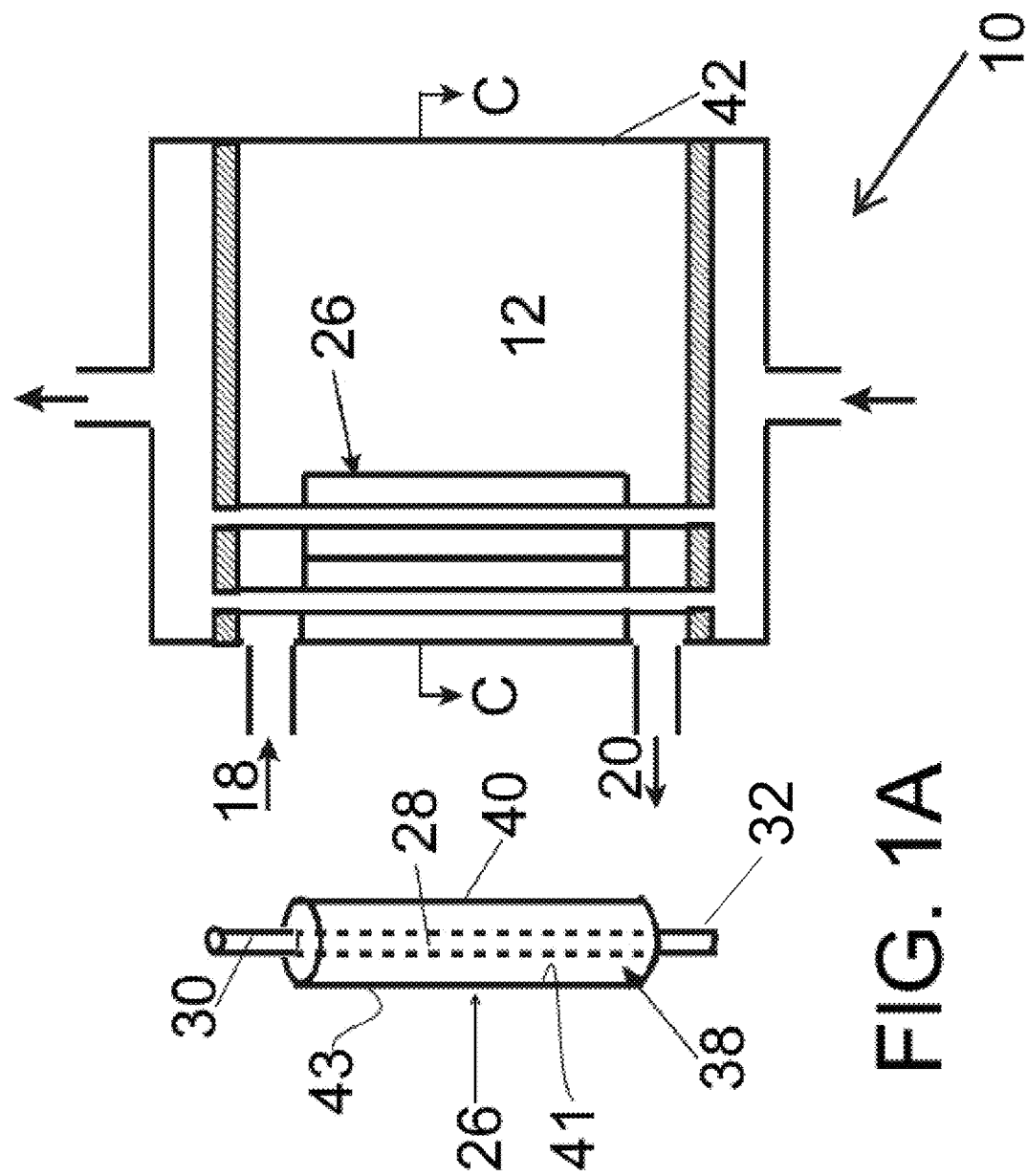

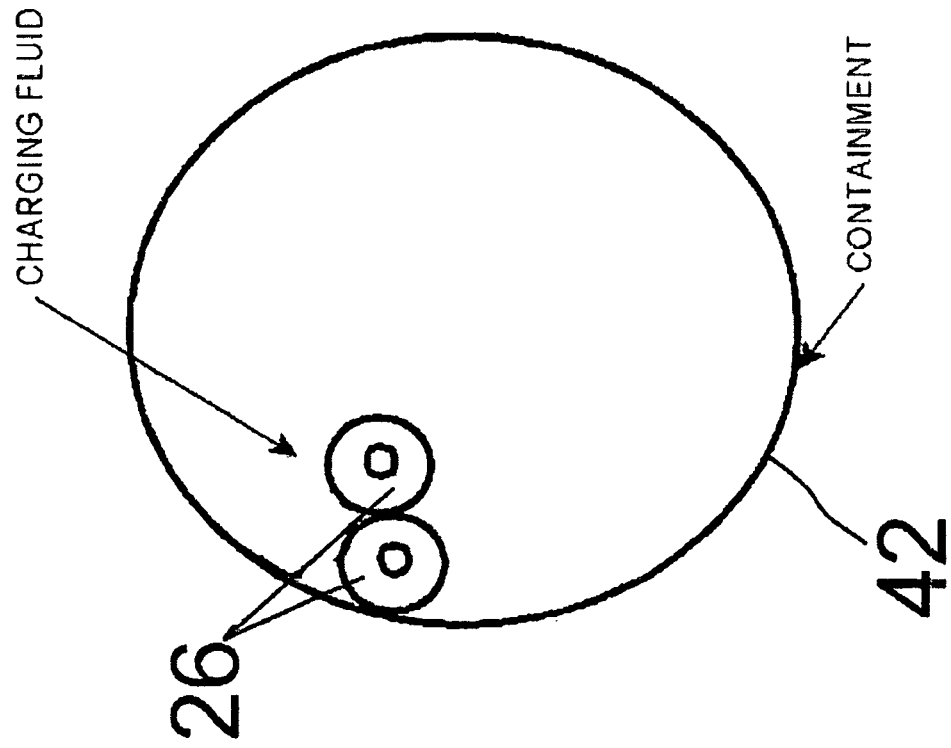

METHOD FOR BUFFERING LATENT HEAT
THERMAL ENERGY

PRIORITY OF THE INVENTION

This U.S. Patent Application claims priority benefit as a Divisional of U.S. Utility patent application Ser. No. 15/648,141 filed on Jul. 12, 2017, currently pending, the entirety of which is incorporated herein by reference.

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention.

This invention relates to a method and system for increasing energy system efficiencies and more specifically this invention is a method and system for buffering energy usage in transportation and power plant scenarios.

2. Background of the Invention.

An important approach to efficiency in energy usage in the transportation and electric power plant industries is to utilize some of the waste heat. In the case of the internal combustion engine, a portion of the waste heat from the engine can be recovered and converted into useful work. In the case of electric power plants, utilization of some of the heat rejected from the plant can reduce water usage in cooling towers or heat transferred to neighboring bodies of water while increasing efficiency. In both industrial cases, the key is creating waste heat recovery systems that are cost effective. A common problem in this endeavor is that the waste heat supply, or waste heat usage, or both are not generally constant. As an example, the heat generated in an automotive vehicle can vary significantly over time due to acceleration, deceleration, stopping and starting. When the heat source and heat utilization are unequal, the systems are either inefficient or cease to recover waste heat entirely.

Low hanging fruit in energy savings abound in the power generation and transportation sector. Two areas where the need for energy savings is particularly acute are fuel burning, and energy production. For example, nearly 35 percent of fuel to engines (e.g., both mobile and immobile applications) is wasted in exhaust gases. This results in excessive fuel burn and further exacerbates the nation's dependence on foreign sources of petroleum.

Water evaporation in cooling tower operations can be measured in the millions of gallons each day for a single power plant. The reduction of water usage and consumption is a priority for all types of power plants and is becoming an essential consideration for their operations due to increased demands for electricity, and increased demands for water in industrial, agricultural and consumer sectors. Constraints on cooling water supplies impact not only the operations of existing power plants, but also the siting decisions of new power plants.

As part of the US Department of Energy's 2010 Super Truck program, waste heat recovery systems were developed for a class 8 diesel truck (18 wheeler). During full recovery of waste heat from the exhaust gas flowing at 28 kg/min from the engine producing 460 hp, the exhaust gas temperature was reduced from 596° F. to 317° F. with the energy going into electricity production.

A need exists in the art for a method and system to store waste heat temporarily and use it to perform useful work. The method and system should mitigate the aforementioned energy inequality between source and utilization, thus increasing the efficiency of the processes. In other words, the method and system should allow for mismatch of heat in and out of a thermal storage system. The method and system should also allow for a constant heat transfer rate in or out of the system with variable rate for the other. Furthermore, the method and system should facilitate its use near an engine or power plant, such that it should be modular.

SUMMARY OF INVENTION

An object of the invention is to provide a thermal storage buffer system and method that overcomes a major obstacle to implementation of waste heat recovery. The buffer system serves as a temporary (e.g. intermittent) energy storage system to overcome the disadvantages of unequal energy input and output, thus increasing energy utilization efficiency.

Another object of the invention is to provide a method for buffering waste heat in energy consumption and energy production scenarios. A feature of the invention is that heat is simultaneously added (charged) and removed (discharged) but at different rates. An advantage is an increase or decrease in heat storage, thereby enabling systems to function at optimal efficiencies. The method and system allows for continuous operation in transition processes such that the method and system provides a buffer that evens up thermal loads caused by varying power outputs and varying heating demands.

Still another object of the invention is to provide a method and system to optimize utilization of heat dissipated in mobile combustion scenarios. A feature of the invention is the buffering of exhaust heat to a heat transfer fluid for utilization by a turbine. An advantage of the invention is an increase in fuel mileage per volume of fuel combusted. Another advantage is a reduction in dissipated heat.

Yet another object of the invention is to provide a method and system to reduce heat dissipation in immobile combustion scenarios. A feature of the invention is reducing temperature of heat transfer fluid prior to its exposure to ambient temperatures and pressures. An advantage of the invention is conservation of heat sink fluid, such as water in instances of cooling tower scenarios. Another advantage is a reduction of heat transferred to the environment: to air, to a body of water or to evaporating water ponds.

Still another object of the invention is to provide thermal buffering in a compact, versatile, efficient configuration. A feature of the invention is the use of phase change material embedded in high porosity foam. An advantage of the invention is that the provision of one or more modules enables versatility in geometry, fabrication, shipping, installation and maintenance/replacement. Briefly, the invention provides a method for reclaiming heat from a first fluid which is supplied at a first temperature, the method comprising contacting the first fluid to a phase change material for a time sufficient to increase the temperature of the phase change material (and perhaps melt a portion of the material) and contacting the phase change material with a second fluid for a time sufficient to increase the temperature of the second fluid while decreasing the temperature of the phase change material (perhaps solidifying some of the melted portion of the phase change material). The PCM (within a high porosity high thermal conductivity foam) acts as a thermal buffer between the first fluid from which waste heat is being extracted and the second fluid to the which the heat is added to be converted into useful work.

In this method, the first fluid and second fluid are in thermal communication with the phase change material simultaneously. The first fluid and second fluid may increase temperatures simultaneously. Alternatively, the first fluid and the second fluid may increase temperatures at different rates.

The invention also provides a system to reclaim heat from a first fluid, the system comprising a first void space containing phase changing material, and a second void space in thermal communication with the first void space. The first void space is adapted to receive the first fluid and the second void space is adapted to receive a second fluid. The material defines a first surface adapted to physically contact the first fluid and a channel adapted to physically contact the second fluid. The channel has a fluid ingress means (e.g., a first or upstream open end), a fluid egress means (e.g., a second or downstream open end), and a longitudinally extending region disposed between the ingress and egress means, wherein the longitudinally extending region is encapsulated or otherwise surrounded by the material so as to be in thermal communication with the material.

The phase change material is homogeneously mixed with foam in a volume ratio range of between about 60:40 and about 90:10. The phase change material may be mixed with foam to form a construct wherein the construct is about 80 percent by volume of phase change material and about 20 percent by volume of foam.

In this system an embodiment of the construct exhibits a thermal conductivity of between about 150 W/mK and about 210 W/mK. The thermal conductivity of the foam may be above about 15 W/mK.

BRIEF DESCRIPTION OF DRAWING

The invention together with the above and other objects and advantages will be best understood from the following detailed description of the preferred embodiment of the invention shown in the accompanying drawings, wherein:

FIG. 1A is a schematic diagram of a phase change module 26, in accordance with features of the present invention;

FIG. 1B is a schematic of modules integrated into a latent heat thermal energy storage buffer system, in accordance with features of the present invention;

FIG. 1C is a view of FIG. 1B taken along line C-C; the containment 42 for the charging fluid is shown along with a representative number of modules.

DETAILED DESCRIPTION OF THE INVENTION

Figure 1D:
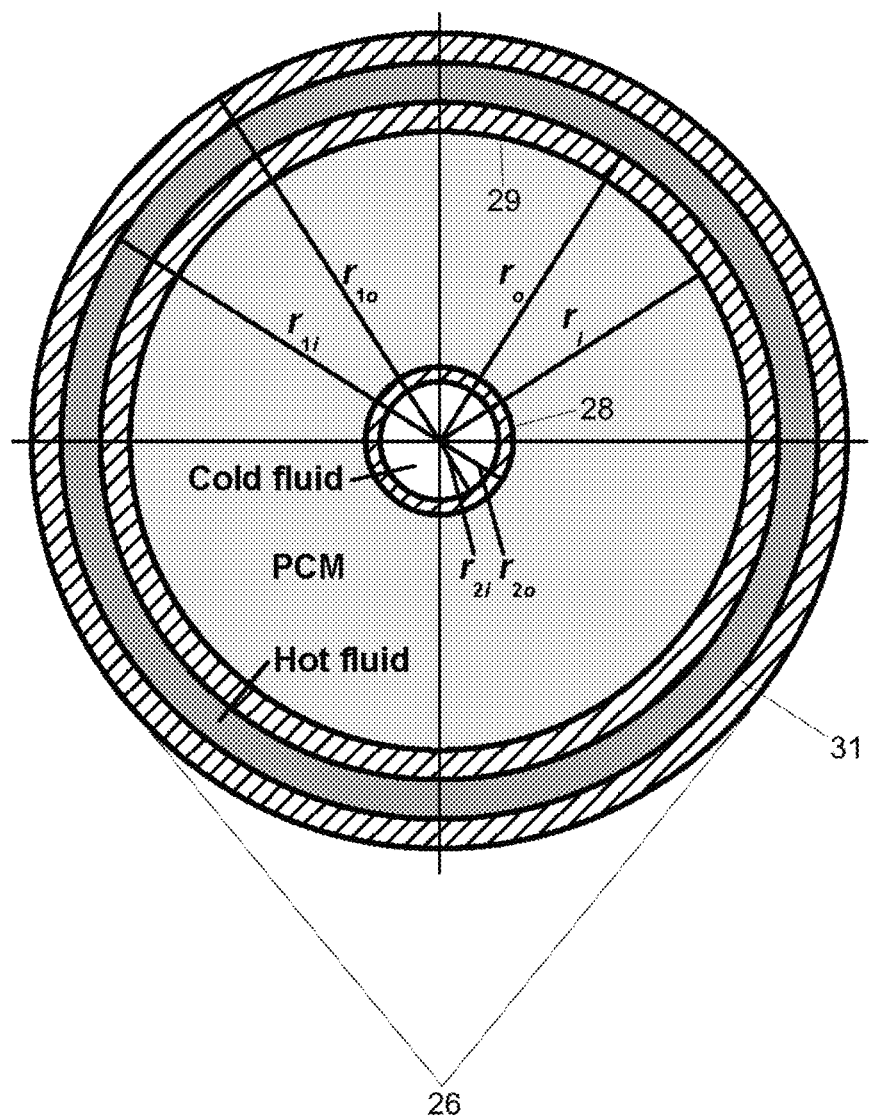
FIG. 1D is a an expanded cross sectional view of an alternate configuration of the latent heat thermal energy storage buffer system in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invented method and system is applicable to engines used in trucks, buses, trains, cars, off-road vehicles and also stationary systems. In such applications, the method and system increases the heat transfer rate of a charging fluid (e.g., exhaust gas) to another fluid. The redirected heat may be used to boil that fluid such as alcohol, which in turn can be used to turn a turbine. A 5 percent increase in fuel mileage is a reasonable result.

The invented method and system is applicable to power plants as well. In these scenarios, the invention is a buffer between a heat utilization fluid and water exiting the condenser downstream of the turbine. The heat utilization fluid cools the condenser water decreasing the plant heat rejection to cooling towers, bodies of water, or air. For example, whereas without application of waste heat recovery, water exiting the condenser prior to entering the cooling tower is typically at 100° F., waste heat recovery may decrease that about 5 percent, or to 95° F. (This cooling occurs prior to return of the water to the air, lake, river, ocean or cooling tower.) Given a typical flow rate of 200,000 gallons per minute (gpm) for a 500-MW electric power plant, the invention will aid in the resulting 20 percent reduction in cooling tower evaporation, or a water savings of more than 1.15 million gallons per day. The modular latent heat thermal energy storage buffer system allows this process to perform continuously without decrease or interruption due to inequality of waste heat available from the plant and the waste heat that can be used at any instant of time.

FIGS. 1A-D are schematic diagrams of various aspects of the invented latent heat buffering system. The system is generally designated as numeral 10 in FIG. 1B. The system 10 comprises a latent heat storage unit 12 encapsulating one or more storage modules 26. The modules are arranged within a housing containment 42 defining a containment of the storage unit 12.

A salient feature of the invented system is the storage module 26 schematically depicted in FIG. 1A. Each of the modules comprise one or more conduits 28 having a first end 30 and second end 32. Longitudinally extending regions of the conduit intermediate its first and second ends are in thermal communication with a phase change composite 38. Most of the longitudinally extending exterior surfaces of the conduit intermediate the first and second ends are encapsulated by the phase change composite 38.

During initial construction of the module, liquid PCM is infiltrated into the foam pores. Then the PCM/foam combination is placed around the conduit 28, and the foam containment 40 is placed around the PCM/foam and sealed. The PCM/foam may be brazed to the conduit and foam containment or the spacing may be minimal and no braze used.

The PCM/foam composite may be a close fit in the annular space outside of the conduit and inside of the containment 43 of each module. Alternatively, the foam can be brazed to the conduits. CFD simulations generally show that it is more economical not to use the brazing.

In this example configuration, fluids flow inside the pipe (conduit) 28 and exterior to a surface 43 of a foam containment structure, 40. PCM/foam 38 is positioned between the inside pipe and the containment structure so as to be in thermal communication with them.

There may by one or more pipes (conduits 28) inside the PCM/foam of each module.

As depicted in FIG. 1B and 1C, the modules 26 are arranged such that their longitudinal axes are parallel with each other. The modules may or may not contact each other. In either configuration, interstices or spaces between the modules exist for fluid passage. In the configuration depicted in FIG. 1B, the charging fluid flows outside the module containment 40 giving up waste heat to the PCM/foam of the modules. The PCM/foam in turn transfers heat to the discharging fluid flowing through the pipes within the PCM/foam. The heat received by the discharging fluid will be utilized, and the PCM/foam of the modules acts as a thermal buffer for modulating the heat rates into and out of the modules. Note that the charging and discharging fluids may flow on either side of the PCM/foam and are not constrained to this example.

FIG. 1C is a view of FIG. 1B taken along line C-C. The containment 42 for the charging fluid is shown along with a representative number of modules.

FIG. 1D is an expanded cross-sectional view of an alternate configuration of the latent heat thermal energy storage buffer system. In this configuration, each module has a separate containment for the charging fluid compared to one containment for the charging fluid flowing to all modules of FIGS. 1B and 1C. There are three conduits or pipes shown in this configuration: a first coaxially positioned conduit 28 (e.g. an interior pipe) carrying a flowing fluid, a single containment pipe 29 around the PCM and foam (marked PCM in FIG. 1D), and an outer pipe 31 forming an annulus for the flow of another fluid. The inner and outer surfaces of the three pipes are marked in FIG. 1D as radii with various subscripts. Specifically, $r_{2i}$ and $r_{2o}$ designate the inner and outer radii respectively of the first coaxially positioned conduit 28. Further, $r_i$ and $r_o$ designate the inner and outer radii respectively of the containment pipe 29. $r_{1i}$ and $r_{1o}$ designate the inner and outer radii respectively of the outer pipe 31.

PCM Composite

Detail

Figure 2A:
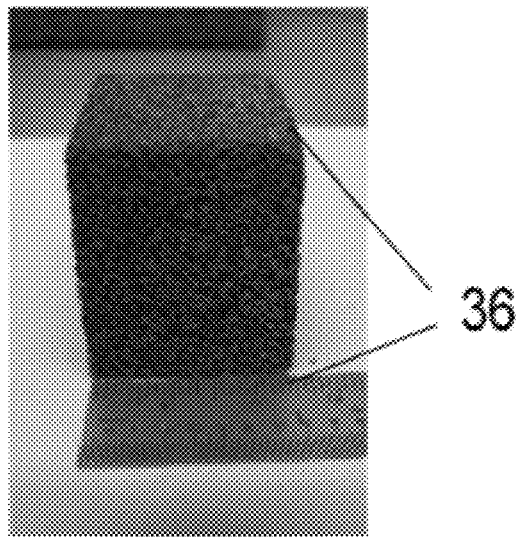
FIG. 2A is a photograph of a 90 percent porosity foam without phase change material infiltration, in accordance with features of the present invention.
Figure 2B:
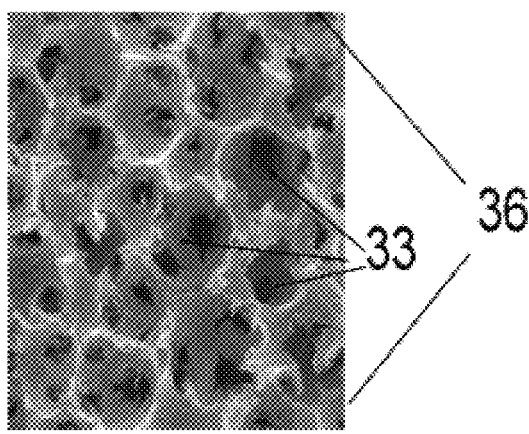
FIG. 2B is a scanning electron microscope image of the foam depicted in FIG. 2A.
Figure 2C:
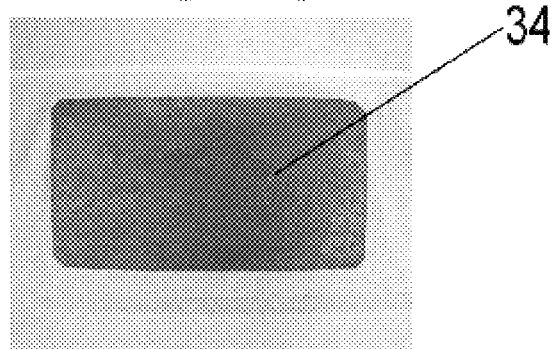
FIG. 2C is a photograph of the foam after infiltration with PCM, in accordance with the features of the present invention.

As depicted in FIGS. 2A-C, the phase change composite 38 comprises a phase change material 34 homogeneously mixed with a high porosity foam 36. (High porosity foam is considered above 80 percent.) Thermal conductivity of the foam within the construct is typically above about 15 W/mK and preferably above about 200 W/mK, and most preferably between about 150 and 210 W/mK. FIG. 2A shows a high porosity (approximately 90 percent) foam without PCM in its pores. The pores 33 are better depicted in the electron microscope image of the foam in FIG. 2B. The pores may pass through the foam monolith, or may be surface aberrations only. The photograph of FIG. 2C shows a foam after infiltration with PCM where the foam pores are filled with PCM.

The phase change material may be homogeneously mixed with foam of porosity of between about 80 percent and about 90 percent. As such, the phase change material is mixed with foam to form a construct and the construct is about 80 percent by volume of phase change material and about 20 percent by volume of foam. The construct exhibits a latent heat of fusion of between about 100 kJ/kg and about 300 kJ/kg.

FIG. 1A is a detailed view of the phase change module 26. The module may be any shape and size with any number of fluid conduits within, so determined by a single housing containment 40 having a first medially facing surface 41 and a second radially facing (i.e., exterior) surface 43. The phase change composite material 38 substantially encapsulates both conduit 28 and the first medially facing surface 41 of the module housing 40. The single housing 40 is comprised of any thermally conductive material, including but not limited to metal, plastic, fiberglass, glass, carbon fiber, ceramic, stone, and combinations thereof. High thermal conductivity (e.g., above 15 W/mK) is preferable and allows the housing to serve as a heat exchange surface between the phase change material composite 38 and fluid contacting the second surface 43 of the housing. The single housing 40 may further comprise structural support members 42 so as to maintain the configuration of the housing.

Generally, suitable foam porosity is about 80 to 90% for the modular latent heat thermal energy storage buffer system. The high conductivity of the foam (typically above about 150 W/mK and preferably above about 200 W/mK) allows heat to flow into and out of the PCM at a fast rate capable of buffering the energy flows. The high porosity of the foam allows for minimal size of the modules and cost of the foam while the PCM reduces the size of the system compared to single-phase energy storage in liquids or solids alone.

A myriad of phase change materials are suitable for incorporation in the invented system. For waste heat recovery applications to engines, generally, the PCM should have a melting temperature above about 180° C. and below about 240° C. Exemplary phase change materials include, but are not limited to p-Aminobenzoic acid, Penterythritol, $LiNO_3$—$NaNO_3$, 40% $KNO_3$-60% $NaNO_3$, and 54% $KNO_3$-46% $NaNO_3$, and combinations thereof. For district heating waste heat recovery from electric power plants, generally the PCM should have a melting temperature above about 30° C. and below about 44° C. Exemplary phase change materials include, but are not limited to Caprilone, Docasyle bromide, N-Henicosame, Phenol, N-Lauric acid, P-Joluidine, n-Dotricontane, n-Tritricontane, Camphenilone, Heptadecanone, I-Cyclohexyl-ooctadecane, and 4-Heptadacanone, and combinations thereof.

The composite 38 thereby embodies a high latent heat of fusion (typically above about 100 kJ/kg and preferably close to about 300 kJ/kg), resulting in small effective volumes. This advantage is enhanced in fabrication, specific system design and maintenance by use of modular components. This combines the advantages of large energy storage capacity from the latent heat of fusion of the PCM and the high thermal conductivity of the foam structure with the versatility of modular design. The high thermal conductivity foam of the composite 38 provides fast charge/discharge rates.

Exterior surfaces of the containment 42 define an ingress means 18 and egress means 20 for a charging fluid. An exemplary charging fluid may be exhaust from a vehicle, anti-freeze/anti-boil fluid from a radiator, or cooling water from a power plant. The system is engineered to handle charging fluids ranging in temperatures from about 30° C. to about 240° C. Generally, the system accepts the charging fluid at the charging fluid means of ingress 18 at a first temperature, and after thermal exchange, discharges the fluid at a charging fluid means of egress 20 at a second temperature that is lower than the first temperature.

This change in temperature between the ingress 18 and egress 20 portals of the housing is the result of the charging fluid contacting exterior surfaces 43 of each of the modules 26.

The temperature of each of the modules 26 is regulated by the temperature of fluid flowing through its center conduit 28, and also the temperature of the fluid contacting the exterior surface 43 of its containment 40. Exemplary fluid contacting the modules' interior surfaces 41 through the conduit 28 may be motor fuel (for preheating), anti-freeze/anti-boil fluid from the vehicle radiator, and fluids with vapor pressures at or above a predetermined pressure, depending on the use of the treated fluid. For example, in situations where a fluid is to be vaporized for turning a turbine, glycols (such as ethylene glycol having a vapor pressure of approximately 0.06 mm Hg at 20° C.) may contact the surfaces of conduits 28. Other polar fluids, such as water, alcohols (such as methanol and ethanol) are also good candidate discharging fluids for evaporation and expansion in turbines.

Alternatively, and as depicted in FIG. 1D, the charging fluid (e.g., hot fluid) may flow in an annulus 45 surrounding each module 26. In this configuration of the invention, each module 26 has its own containment replacing the containment 40 surrounding all modules together as shown in FIGS. 1 B and 1C.

In summary, there are two heat transfer fluids in this system. One fluid flows through the conduits 28 encapsulated by the modules such that the first fluid is in thermal communication with the module. The second fluid flows outside the modules but in thermal and maybe physical, communication with the module. In an embodiment of the invention, the first fluid is considered the charging fluid, while the second fluid is considered the discharging fluid. Heat from the charging fluid may not equal the heat to the discharging fluid at any given time. If there is more heat being supplied than removed, energy will be stored in the phase change material, with the converse also true. Energy may continuously enter and leave the system at differing rates over time.

Waste heat recovery may be applied to virtually any size vehicle if the recovery system can be kept small. For large class 8 trucks there is some flexibility with the size and placement of components. In this case, diesel engines of about 500 hp are typical. Exhaust gas flowrates at full power are approximately 30 kg/min at about 600° F. The heat in the exhaust gas is usually dissipated in the atmosphere and is the source of heat for the recovery system. Heat may be extracted from the exhaust gas recirculation (EGR) system or from the exhaust in the tail pipe of the vehicle or both.

In electric power plants, the source of waste is the condenser water typically at a temperature of about 120° F. The potential for waste heat recovery is very large. For a 500 MW electric power plant, running at 40% thermal efficiency, 750 MW of heat is typically dissipated to the atmosphere and is the source of the waste heat recovery.

The invention provides a method for reclaiming heat from a first fluid, the method comprising contacting the first fluid to a phase change material/foam combination for a time sufficient to increase the temperature of the material and or liquefy some of it; and contacting the material to a second fluid for a time sufficient to increase the temperature of the second fluid and to decrease the temperature of the material or to solidify some of it. The invention includes a modular design which facilitates fabrication, installation, maintenance, and design flexibility according to the application. The invention also provides a system to reclaim heat from a first fluid, the system comprising a first void space containing phase changing material, and a second void space in thermal communication with the first void space. The system functions as an efficient thermal storage buffer when heat supplied from the first fluid is not equal to the heat received by the second fluid at any instant of time. Alternatively, the heat given up by the first fluid equals the heat gained by the second liquid fluid.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for reclaiming heat from a first fluid, the method comprising:
   a) continuously contacting the first fluid to a single bulk of phase change material for a time sufficient to decrease the temperature of the first fluid and transfer heat to the phase change material, wherein all of the phase change material is confined within a single annular space defining a first space and the first fluid is flowing through the first space; and
   b) continuously contacting the phase change material to a second fluid flowing through a second space in thermal communication with the first space for a time sufficient to increase the temperature of the second fluid and transfer heat from the phase change material wherein the phase change material is between the first fluid and the second fluid to form a thermal buffer between the fluids; wherein both the first fluid and the second fluid contact the phase change material simultaneously such that heat is simultaneously added and removed to the phase change material.

2. The method as recited in claim 1, wherein the transfer of heat to the phase change material differs from the transfer of heat from the phase change material.

3. The method as recited in claim 1, wherein the first fluid and the second fluid change temperatures at different rates.

4. The method as recited in claim 1, wherein heat supplied by the first fluid is not equal to the heat received by the second fluid at any instant in time.

5. The method as recited in claim 1, wherein the first fluid flows through a conduit extending through the single bulk of phase change material and the second fluid contacts an exterior of the single annular space.

6. The method as recited in claim 1, wherein the phase change material is homogeneously mixed with a foam of porosity of between about 80 percent and about 90 percent.

7. The method as recited in claim 1, wherein the phase change material is mixed with a foam to form a construct and the construct is about 80 percent by volume of phase change material and about 20 percent by volume of said foam.

8. The method as recited in claim 7, wherein the construct exhibits a latent heat of fusion of between about 100 KJ/kg and about 300 KJ/kg.

9. The method as recited in claim 6, wherein the thermal conductivity of the foam is above about 15 W/mK.

10. The method as recited in claim 3, wherein the heat given up by the first fluid does not equal the heat gained by the second fluid.

11. The method as recited in claim 1 wherein the phase change material has a melting temperature above 180 C.

12. The method as recited in claim 1 wherein the phase change material has a melting point temperature above 180 C and below 240 C.

13. A method for reclaiming heat from a first fluid, the method comprising:
   a) continuously contacting the first fluid to a single bulk of phase change material for a time sufficient to decrease the temperature of the first fluid and transfer heat to the phase change material to melt a portion of the phase change material, wherein all of the phase change material is confined within a single containment pipe; and
   b) continuously contacting the phase change material to a second fluid for a time sufficient to increase the temperature of the second fluid and transfer heat from the phase change material, wherein the phase change material is between the first fluid and the second fluid, wherein the first fluid and the second fluid to form a thermal buffer between the fluids; wherein both the first fluid and the second fluid contact the phase change material simultaneously such that heat is simultaneously added and removed to the phase change material.

14. The method as recited in claim 13 wherein the heat given up by the first fluid does not equal the heat gained by the second fluid.

15. The method as recited in claim 13 wherein the phase change material has a melting point temperature above 180 C and below 240 C.

16. The method as recited in claim 13 wherein the phase change material does not change temperature.

17. The method as recited in claim 5 wherein the single annular space is defined by a containment pipe and the second fluid contacts exterior surfaces of the containment pipe.

18. The method as recited in claim 13 wherein the second fluid contacts exterior surfaces of the containment pipe.

19. The method as recited in claim 1 wherein the first fluid is cooling water from a power plant and the cooling water decreases in temperature by about five percent.

20. The method as recited in claim 13 wherein the first fluid is cooling water from a power plant and the cooling water decreases in temperature by about five percent.

21. The method as recited in claim 1 wherein the first fluid is heated with exhaust gases which are at about 600° F.

22. The method as recited in claim 13 wherein the first fluid is heated with exhaust gases which are at about 600° F.

* * * * *